Patented Apr. 20, 1948

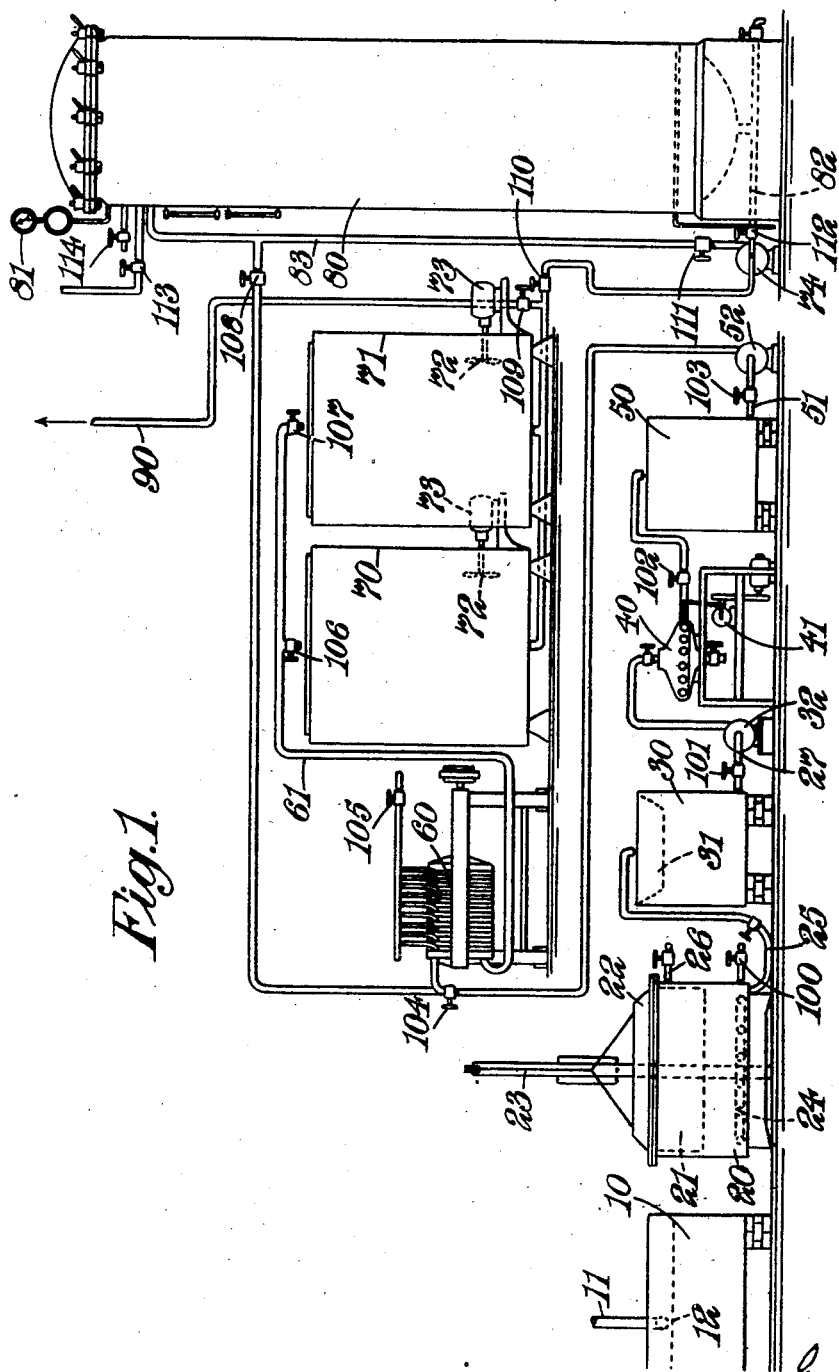

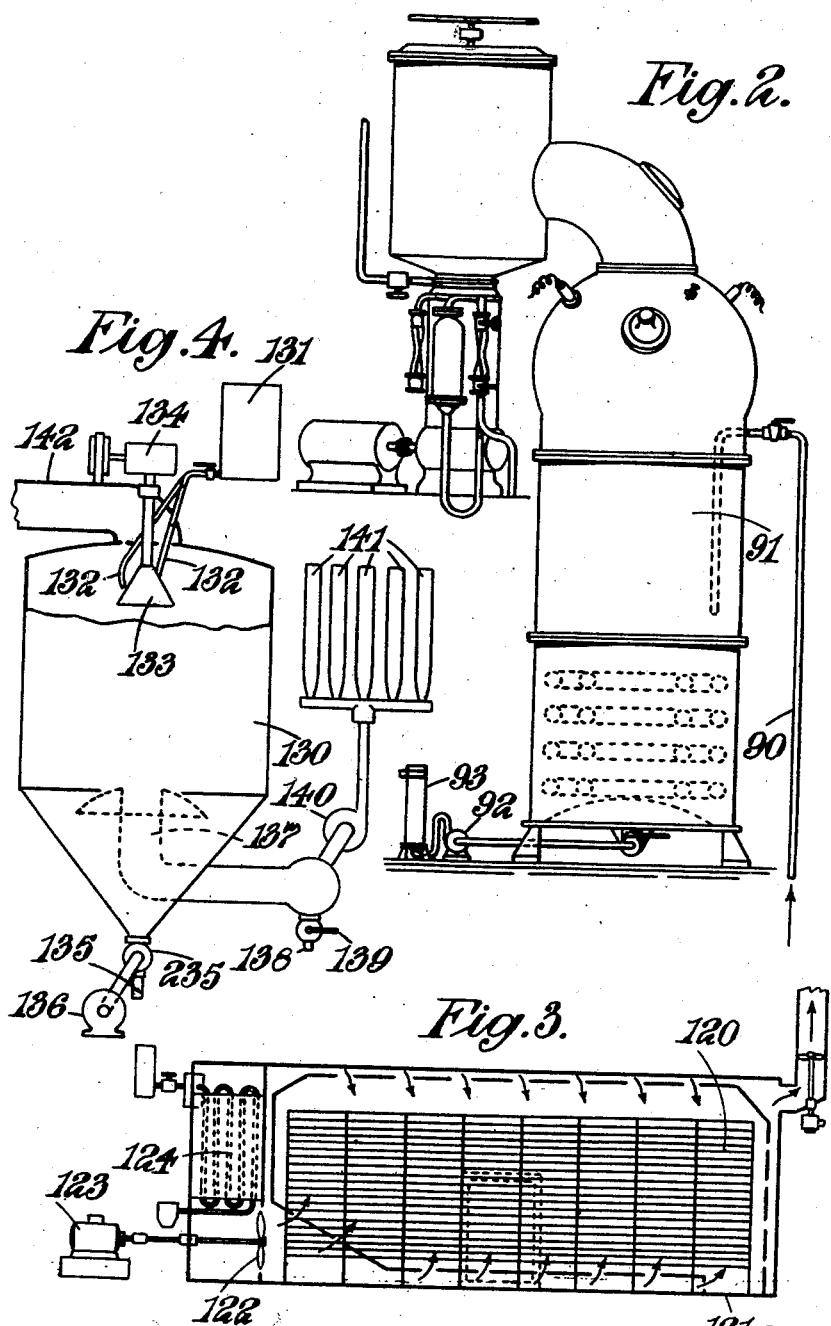

2,439,964

UNITED STATES PATENT OFFICE 2,439,964

EXTRACTION AND PREPARATION OF AGAR

Joseph Francis Byrne, Hove, and Philip Steward Powling, London, England

Application July 26, 1944, Serial No. 546,698
In Great Britain August 10, 1943

6 Claims. (Cl. 260—209.6)

This invention consists in improvements in or relating to the extraction and preparation of agar. An object of the invention is to produce agar from seaweeds found particularly on the British coast and similar weeds found elsewhere.

The types of weed from which agar has been successfully extracted and which are found around the British coast are mainly described as carrageen moss, for example Gigartina, Chondrus crispus, and the like, but the invention is not limited to these particular types and it is applicable to all weeds from which it is possible to extract agar.

Broadly, the invention comprises in the treatment of seaweed of the kind specified, the step of treating an aqueous extract obtained from the weed to heat and pressure in the presence of an agar-producing product of an alkali, particularly a hydroxide, such as potassium hydroxide.

The extract is itself preferably obtained by heating the weed in water containing a small proportion of calcium hydroxide or the hydroxide of another alkali earth or any other medium which will promote hydrolysis.

Following the treatment of the extract by heat and pressure in the presence of potassium hydroxide or other agar-producing material as stated above, agar is finally obtained by neutralising the solution, for instance, with hydrochloric acid, decolorising the neutral liquid, for instance with charcoal, and thereafter filtering and concentrating the liquid and finally drying the concentrated product thus obtained.

In order that the invention may be more clearly understood one preferred example will now be described with the aid of the accompanying drawings, in which Figure 1 is a flow sheet indicating the several steps in the treatment of agar;

Figure 2 shows in elevation on an enlarged scale one form of evaporator;

Figure 3 shows an alternative means for drying the extract, and

Figure 4 shows a still further alternative drying means.

Like reference numerals indicate like parts in the several figures of the drawings.

Referring to Figure 1, the seaweed is first weighed and the required quantity, say 100 lbs. weight, is placed in a tank 10 holding conveniently approximately 600 gallons of water, the water being admitted through pipe 11 and a spraying outlet 12 by which arrangement the weed is kept in constant agitation as it is washed. The water is supplied at high pressure.

The washed weed is thereafter collected and passed to an extractor 20 and this operation is preferably carried out by hand. The extractor is conveniently 400 gallons capacity for the weight of weed above mentioned. The weed is placed into a rectangular basket 21 situated in the upper part of the extractor, and to the weed is added 3% of calcium hydroxide based on the weight of the weed and the extraction tank 20 is then filled with hot water. The lid 22, which is manipulated conveniently by a wire hoist 23 is lowered into position and clamped down by any preferred means. The temperature of the water is then raised to just over boiling point so as to produce a pressure of approximately 2 lbs. in the tank, this heating being effected by means of a steam heating coil 24. The connections for the coil and the means for supplying steam thereto, however, are not shown as these may be of any preferred form and will be well understood. The weed is held in the tank under these conditions for 1½ hours and the resultant liquid or extract is thus passed by means of pipe 25 to a straining tank 30, the capacity of which is approximately 200 gallons.

A strainer 31 is situated at the top of the tank 30 so as to receive the liquid extract passed through pipe 25. The transference of the extract is produced by the pressure obtaining within the extraction tank 20 assisted by high pressure live steam which is released at that time on to the surface of the weed through, for instance, pipe 26.

The liquid is next pumped from the tank 30 through pipe 27 into a disc strainer 40 by means of a centrifugal pump 32. The disc strainer which is known under the trade name of Auto-Kleen strainer comprises a series of hollow candles made up of discs spaced 0.005 inch apart and between these discs are cleaning fins. The discs are rotated with the aid of a self-contained motor or they may be hand-operated as desired. This disc strainer has the effect of removing all pieces of leaf which may have passed through strainer 31.

The liquid on leaving the strainer 40 is forced by means of pump 32 into a balance tank 50 of approximately 200 gallons capacity. Pump 32 has sufficient power to force liquid through the discs in strainer 40 into tank 50. A driving device 41 is indicated for driving cleaning apparatus which is operative between the discs of strainer 40. The outlet 51 from this tank communicates with a centrifugal pump 52.

Pump 52 next passes liquid from tank 50 to a steam-jacketed filter press 60 and from the press it is transferred through pipe 61 to two stainless steam-jacketed holding tanks 70 and 71, each having a capacity of 400 gallons. In each of these two tanks there is an agitator 72 and each agitator is driven by an electric motor 73.

When the two tanks 70 and 71 are filled, the requisite quantity of potassium hydroxide is added while the liquid is maintained in agitation by the agitators 72. The quantity of potassium hydroxide for the amount of liquid that is passing through the apparatus is approximately 15% based on the total solids present in 800 gallons of liquid.

After the addition of potassium hydroxide the liquid is pumped by means of pump 74 into a cylindrical autoclave 80 having a capacity of approximately 1000 gallons. The autoclave is lagged with heat-insulating material and is equipped with a steam-heating coil for heating the contents, a safety valve and with automatic pressure steam control means none of which, however, is illustrated as these are all well understood and of themselves form no part of the present invention. A pressure gauge 81 is also employed. When the contents of tanks 70 and 71 have been transferred to the autoclave the pressure is brought up as rapidly as possible to approximately 40 lbs. per square inch and the liquid is intermittently circulated also by means of pump 74, circulation being effected by withdrawing the liquid from the base of the autoclave through pipe 82 and discharging it through pipe 83 to enter near the top of the autoclave. Necessary control cocks for permitting and controlling the various operations of the whole apparatus are shown in the drawings and are indicated by the reference numerals 100 to 114 respectively. As the pressure approaches 40 lbs. per square inch the liquid will be circulated constantly until there is no drop in temperature due to circulation and the required pressure of 40 lbs. is eventually reached. Then the automatically operated pressure steam valve will maintain the temperature at this pressure and the liquid will be held in this state for two hours, whereafter the pressure is released. The release of pressure occurs through a steam line controlled by cock 114 and the steam is allowed to blow out to atmosphere. For this purpose the steam escape line is connected to the top of the autoclave in order to eliminate waste due to surging when the pressure is released and turbulence occurs within the autoclave. After the pressure has been reduced to that of the surrounding atmosphere the liquid is thus neutralised with hydrochloric acid to a pH value of 7 circulation occurring during the addition of the acid. This again will be effected through the medium of pump 74.

Activated charcoal is then added to the contents of the autoclave, the amount added being 0.2% based on the weight of solids in the liquid and the charcoal is circulated through the mass of liquid in the autoclave for at least thirty minutes, again using pump 74.

The contents of the autoclave is now passed through a steam-heated filter press which may be filter press 60, the liquid being pumped by means of pump 74 and the proper actuation of the various control cocks in order to allow liquid to be passed to the filter press. The processed extract is then returned from the filter press to the holding tanks 70 and 71 from which it is drawn, as required, into an evaporator such, for instance, as that illustrated in Figure 2, the liquid passing from tanks 70 and 71 through pipe 90 into the evaporator. The evaporator which is designated generally by the reference numeral 91 is of any known or preferred form and should be capable of evaporating and condensing approximately 5000 lbs. of water per hour. During this operation the liquid is condensed to a quarter of its original volume under a vacuum of approximately 20 inches of mercury.

From the evaporator the condensed liquid is drawn by means of a centrifugal pump 92 and forced into tin-lined moulds each approximately holding 1 gallon, one such mould being shown in position at 93. In these moulds it is allowed to set into a firm gel.

When the gel has solidified in the moulds the moulded block of material is removed and shredded in any preferred shredding machine. A convenient form is constructed as a rectangular steel frame across which are stretched fine piano wires spaced ⅛" apart. By this means the moulded mass is cut into strips of concentrated gel of approximately ⅛" thick.

These shredded strips are then placed on racks 120 in a drying room 121 through which hot air is circulated by means of a fan 122 driven by a motor 123. Heating coils 124 serve to heat the air before it is passed by fan 122 into the drying room 121, and the temperature of the air is maintained at approximately 180° F.

The dry shreds from the racks 120 are then removed and passed through any preferred form of mill in which they are ground to a fine powder. After grinding, the material must be kept in air-tight containers as it is found to be slightly hygroscopic.

Alternatively, instead of employing drying room 121 illustrated in Figure 3, the condensed liquid from the evaporator 91, condensed to approximately one fourth of the original volume, is transferred directly to a spray drier 130 indicated diagrammatically in Figure 4. For this purpose the liquid from tanks 70 and 71 can be pumped into a feed tank 131 from which the liquid is allowed to pass through branch pipes 132 on to the surface of a rapidly revolving cone 133 driven by a motor 134. The speed of this cone is approximately 8000 R. P. M. and a hot blast of air for drying the liquid spray is supplied through air trunk 142.

The majority of the dried powder can be drawn off through pipe 135, a motor 136 driving a revolving valve situated in casing 235 and controlling the outlet from pipe 135. The valve is such that at no time will there be a direct opening of the main chamber 130 to atmosphere. In addition, or alternatively, the powder may pass into an interceptor 137 from which it can be extracted through pipe 138 and manually operated control cock 139; and/or the powder may be removed by means of a suction pump 140 by which it is passed to collecting dust bags 141. Any or all of these means of extracting dried powder from the drier 130 may be utilised.

As a further alternative method of drying to produce the resultant powder, concentrated jelly from evaporator 91 may be frozen in trays and the water extracted in the form of ice. When the jelly freezes, the remaining water forms a shell around the outside of the mass and the agar-containing jelly becomes increasingly concentrated during the treatment. The ice is then removed and the very highly concentrated agar jelly remaining is finally dried in a room such as 121 (Figure 3) and subsequently milled.

We claim:

1. In the treatment of seaweed of the kind specified for the production of agar the steps of first obtaining an aqueous extract from the seaweed by boiling with a weak alkaline solution, separating the resultant liquor and thereafter treating the latter under heat and pressure in an autoclave-type apparatus in the presence of potassium hydroxide.

2. The treatment of seaweed according to claim 1 in which the liquid obtained after treating the aqueous extract is neutralized, filtered, concentrated and dried.

3. The treatment of seaweed according to claim 1 in which the liquid obtained after treating the aqueous extract by heat and pressure is finally neutralized, filtered, concentrated and dried, and in which the liquid before drying is also decolorized.

4. The treatment of seaweed according to claim 1 in which the aqueous extract is prepared by heating the seaweed in water containing a small proportion of a hydrolyzing agent consisting of a hydroxide of an alkaline earth metal.

5. The treatment of seaweed according to claim 1, in which the aqueous extract is prepared by heating the seaweed in water containing a small proportion of a hydrolyzing agent consisting of a hydroxide of an alkali metal.

6. A process for the preparation of agar comprising treating an aqueous extract of seaweed by subjecting the same to the action of heat and pressure in an autoclave type apparatus in the presence of potassium hydroxide.

JOSEPH FRANCIS BYRNE.
PHILIP STEWARD POWLING.

REFERENCES CITED

The following references are of record in the file of this patent:

UNITED STATES PATENTS

| Number | Name | Date |
|---|---|---|
| 784,349 | Riebensahm | Mar. 7, 1905 |

FOREIGN PATENTS

| Number | Country | Date |
|---|---|---|
| 673 | Great Britain | Feb. 19, 1879 |